UNITED STATES PATENT OFFICE.

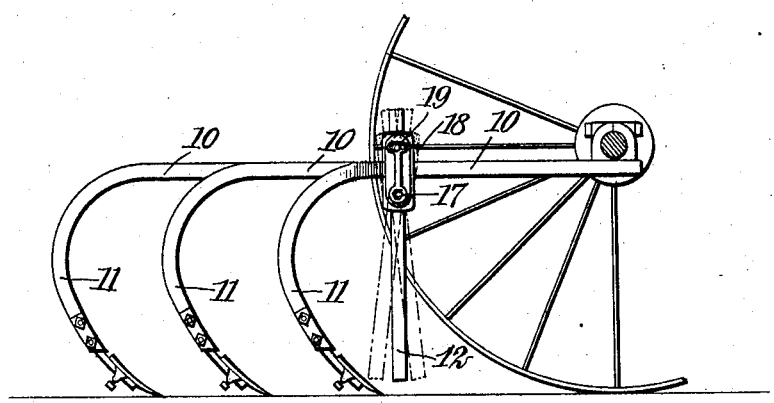
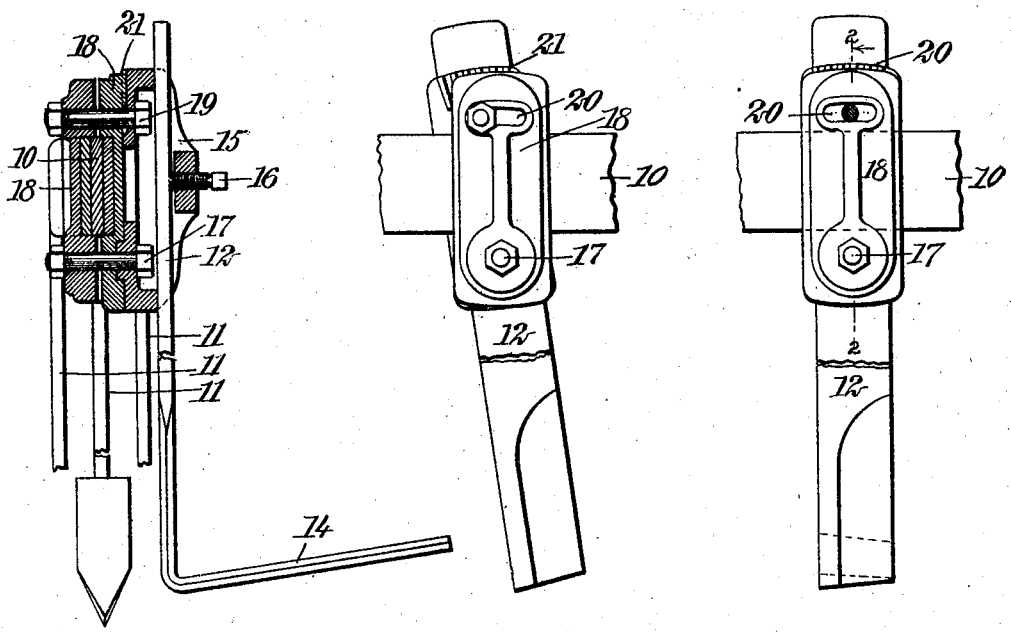

AUGUSTUS M. POTTS, OF CEDAR POINT, KANSAS.

CULTIVATOR ATTACHMENT.

No. 823,808.   Specification of Letters Patent.   Patented June 19, 1906.

Application filed March 2, 1906. Serial No. 303,824.

*To all whom it may concern:*

Be it known that I, AUGUSTUS M. POTTS, a citizen of the United States, and a resident of Cedar Point, in the county of Chase and State of Kansas, have invented a new and Improved Cultivator Attachment, of which the following is a full, clear, and exact description.

The invention relates to a novel knife and means for attaching it to cultivators, so that as the ground is cultivated the knife or knives precede the cultivating-tools and cut down the weeds growing on the part of the field being acted on.

An important object of my invention is to provide means for attaching the knives which will permit the easy and universal adjustment of their position whereby to adapt them to various classes of work without injuring the plants under cultivation.

These and other objects I attain by certain peculiar features of construction and combination of parts, all of which will be fully set forth hereinafter, and particularly pointed out in the claims.

Reference is to be had to the accompanying drawings, which illustrate as an example the preferred embodiment of my invention, in which—

Figure 1 is a fragmentary side view showing the knife in position. Fig. 2 is an enlarged section on the line 2 2 of Fig. 4. Fig. 3 is an enlarged side view of the knife-clamp, and Fig. 4 is a similar view showing the parts in a different position.

The invention may be applied to a cultivator having one or more beams 10, which carry cultivating-tools 11, either one or a plurality of tools for each beam. The knife, as shown best in Fig. 2, comprises a vertically-disposed shank 12, at the lower end of which is arranged a horizontally-extending blade 14. This blade is arranged to move over the surface of the ground in front of the cultivating-tools, so as to sever any weeds or other growths not being cultivated prior to the operation of the cultivating tools on the ground. The shank 12 is engaged in a holder 15, which loosely receives the shank and is provided with a set-screw 16, by means of which the shank may be securely held in the holder, the set-screw permitting the longitudinal adjustment of the shank to raise or lower the blade 14, as required. The holder 15 carries a bolt 17, which extends loosely through two clamp-jaws 18 and by means of which said jaws are pivotally connected with the holder. The holder 15 also carries a bolt 19, which extends loosely through slots 20 formed in the jaws 18. These bolts 17 and 19 serve to securely connect the holder with the clamp-jaws, and in addition the bolt 17 serves as a pivot around which the clamp-jaws and holder may have relative movement, while the bolt 19 serves in addition as a means for adjustably holding the clamp-jaws and holder in any relative position desired. To facilitate thus holding said parts, they are formed with serrated engaging surfaces 21, as shown. The clamp-jaws are recessed to receive between them the beam 10 and are intended to be moved rigidly thereon. It will thus be seen that the knife may be adjusted freely in the holder 15 and that the inclination of the table may be adjusted as desired by swinging the holder around the center of the bolt 17 and afterward tightening up the bolt 19 to retain the holder in the position desired. By these means the knife is mounted so that it may be allowed a large range of adjustability, enabling it to be used under various and diverse conditions.

Having thus described the preferred form of my invention, what I claim as new, and desire to secure by Letters Patent, is—

1. In a cultivator, the combination with the beam, of a clamp comprising jaws provided with coöperating recesses to receive the beam, said jaws having alined openings below the beam, and alined slots above the beam, a holder provided with openings registering with the openings and the slots of the jaws, bolts traversing said openings and slots for securing the jaws to the beam, and the holder to the jaws, and a knife comprising a shank and an angular blade adjustably mounted in the holder.

2. In a cultivator, the combination with the beam, of a clamp comprising jaws provided with coöperating recesses to receive the beam, said jaws having alined openings below the beam, and alined slots above the beam, bolts traversing the openings and the slots, a holder secured to one of the jaws, and a knife comprising a shank adjustably mounted in the holder, and an angular blade connected with the shank.

3. The combination with a cultivator having a beam with a cultivating-tool thereon, of two clamp-jaws, adapted to embrace the beam, a holder, a bolt pivotally connecting the holder and clamp-jaws, a second bolt fastened to the holder and extending through slots in the clamp-jaws, and a knife having a vertical shank engaged in the holder and a horizontally-disposed blade at the lower end of the shank.

In testimony whereof I have signed my name to this specification in the presence of two subscribing witnesses.

AUGUSTUS M. POTTS.

Witnesses:
W. E. BIDWELL,
JOHN BELL.